(12) United States Patent
Jaiswal

(10) Patent No.: US 12,423,315 B2
(45) Date of Patent: Sep. 23, 2025

(54) ON-DEMAND DATA INGESTION SYSTEM AND METHOD

(71) Applicant: Anupam Jaiswal, Bannockburn, IL (US)

(72) Inventor: Anupam Jaiswal, Bannockburn, IL (US)

(\*) Notice: Subject to any disclaimer, the term of this patent is extended or adjusted under 35 U.S.C. 154(b) by 148 days.

(21) Appl. No.: 17/228,909

(22) Filed: Apr. 13, 2021

(65) Prior Publication Data

US 2021/0334279 A1 Oct. 28, 2021

Related U.S. Application Data

(60) Provisional application No. 63/015,666, filed on Apr. 26, 2020.

(51) Int. Cl.
| | |
|---|---|
| G06F 16/00 | (2019.01) |
| G06F 16/2455 | (2019.01) |
| G06F 16/2458 | (2019.01) |
| G06F 16/25 | (2019.01) |
| G06F 16/26 | (2019.01) |
| G06F 16/28 | (2019.01) |

(52) U.S. Cl.
CPC .... *G06F 16/2465* (2019.01); *G06F 16/24565* (2019.01); *G06F 16/254* (2019.01); *G06F 16/26* (2019.01); *G06F 16/287* (2019.01); *G06F 2216/03* (2013.01)

(58) Field of Classification Search
None
See application file for complete search history.

(56) References Cited

U.S. PATENT DOCUMENTS

| | | | | |
|---|---|---|---|---|
| 9,454,577 | B1* | 9/2016 | Kapoor | G06Q 30/04 |
| 9,712,639 | B2* | 7/2017 | Greiner | H04L 67/306 |
| 9,767,312 | B2* | 9/2017 | Sahoo | H04L 41/5054 |
| 9,998,434 | B2* | 6/2018 | Verzun | H04L 9/34 |
| 10,270,794 | B1* | 4/2019 | Mukerji | H04L 63/1458 |
| 10,491,575 | B2* | 11/2019 | Verzun | H04L 63/0464 |
| 10,693,969 | B2* | 6/2020 | Cho | H04L 65/1069 |
| 11,431,744 | B2* | 8/2022 | Mukerji | H04L 63/1425 |
| 2015/0006732 | A1* | 1/2015 | Schmidt | H04L 47/783 709/226 |
| 2015/0120900 | A1* | 4/2015 | Sahoo | H04L 67/1001 709/223 |

(Continued)

OTHER PUBLICATIONS

On-Demand Resource Provisioning for BPEL Workflows Using Amazon's Elastic Compute Cloud, IEEE, Dornemann et al., (Year: 2009).*

(Continued)

*Primary Examiner* — Jean M Corrielus
(74) *Attorney, Agent, or Firm* — Jundong Ma

(57) ABSTRACT

Disclosed herein is novel system and method for business data handling technology that provides on-demand access to business data and provisioning the business data flexibly for use by multiple applications, and for storage to multiple cloud environments. In exemplary embodiments, the system comprises an on-demand data ingestion service module and a service agent existing independently from the remaining entrenched architectural elements of a business information system architecture.

18 Claims, 3 Drawing Sheets

(56) References Cited

U.S. PATENT DOCUMENTS

| | | | | |
|---|---|---|---|---|
| 2016/0036895 | A1* | 2/2016 | Greiner | H04L 67/306 |
| | | | | 709/217 |
| 2017/0308401 | A1* | 10/2017 | Argenti | G06F 9/5027 |
| 2018/0018870 | A1* | 1/2018 | Sehra | G06T 7/11 |
| 2019/0018870 | A1* | 1/2019 | Bhagwat | G06F 16/256 |
| 2022/0245470 | A1* | 8/2022 | Acharya | H04L 67/34 |

OTHER PUBLICATIONS

Website Content and Screenshots, TIBCO Data Integration Technology Solutions: PDF screenshots from: https://www.tibco.com/solutions/data-integration, retrieved Apr. 10, 2021.

* cited by examiner

ON-DEMAND DATA INGESTION SYSTEM AND METHOD

CROSS-REFERENCE TO RELATED APPLICATIONS

This application claims priority to and the benefit of U.S. provisional application Ser. No. 63/015,666 filed on Apr. 26, 2020 and entitled On-Demand SAP Data Access Using OData API on REST Protocol in Real Time and Batch Mode for Cloud and On-Premise Applications, the contents of which are expressly incorporated herein by reference.

FIELD

The present invention relates to business data processing. More particularly, the present invention improves business data handling technology by providing on-demand access to business data and provisioning the business data flexibly for use by multiple applications, and for storage to multiple cloud environments.

BACKGROUND

FIG. 1 illustrates traditional business data handling and processing architectures. Architectures 105a, 105b and 105c represent the business data handling and processing architectures of three representative business.

Architecture 105a is referenced first for the purposes of illustration and elaboration. Architecture 105a illustrates system of record elements 103), 106 through 109. system of record elements 103, 106 and 109 may be respective business information software and data elements including, as examples, Enterprise Resource Planning (ERP), Customer Relationship management (CRM), and Business Information Warehouse (BW). Each of the system of record elements are central for operating and automating business processes. The majority of businesses worldwide manage their systems of record with SAP, the market leader in business data management. Consequently, the data in the respective system of record elements is formatted according to SAP defined formats, structures, and access and manipulation protocols.

Another feature of the traditional business data handling and processing architecture 105a is backend layer 112. Backend layer 112 may include SAP application servers and SAP NetWeaver, as examples. System of record elements 103, 106 and 109, and backend 112 are typically "on-premise," secured from the external world by connect layer 115.

Architecture 105a also includes connect layer 115. Connect layer 115 includes certain aspects of the physical computing network and a firewall, as examples. Connect layer 115 interfaces the on-premise elements to the outside world, for example the internet and cloud environments and resources, and also securely isolates the on-premise elements.

Architecture 105a further includes integration layer 118. Integration layer 118 includes software components that facilitate access to and interaction with the system of record elements 103, 106 and 109, through connect layer 115, for consumption by cloud storage 121, workforce accessible applications 124, business process applications 127 and machine learning and data science services 130. Cloud storage 121 is convenient for providing access to business data for use by applications and processes such as workforce accessible applications 124, business process applications 127 and machine learning and data science services 130.

Workforce accessible applications 124 may include data visualization applications that in some cases make use of live, real-time data, such as the applications Tableau and Power BI, as examples. Business process applications 127 may include, as examples: an eCommerce application which automates product suggestions based on a current shopping cart, likes on social media and/or previous buying history; and a supply chain application which reassigns a home delivery package to another logistics provider who is predicted to better meet the delivery timelines under the current circumstances.

Machine learning and data science services 130 access data stored in cloud storage 121, or are provided data directly, to accomplish functions including predictive functions. An example includes a utility company predicting maintenance needs for their key equipment in the field so that it is maintained preventively, before the equipment breaks down and hampers the supply of services to consumers. Another example includes identifying prospective customers and predicting when and through which channel to reach them that will have the highest probability for converting the prospect to a buying customer.

These traditional architectures 105a, 105b and 105c have significant inherent shortcomings and limitations. Specifically, it would be advantageous to make all data associated with system of record elements 103, 106 and 109 available on demand, live and in real time, and in batch mode, to any cloud storage environment, any workforce accessible application, any business process application, any machine learning and data science service, application and function, as well as any on-premise application that operates behind connect layer 118. However, such flexibility is not available in traditional architectures such as those represented by architectures 105a, 105b and 105c.

Instead, each architectures 105a, 105b and 105c are limited as to which cloud storage environment, which workforce accessible applications, which business processes and which machine learning and data science services can be supplied and operate on the business data. Moreover, providing the business data requires in virtually every case, custom configuration and programming defining what subset of data is to be supplied, as well as other parameters.

For example, architecture 105a may be an SAP oriented architecture. Such an SAP oriented architecture may be limited at the backend layer 112 to SAP's Advanced Business Application Programming (ABAP) and/or SAP's NetWeaver Application Server. And, such an SAP oriented architecture might be limited at integration layer 118 to SAP's API-Management (SAP APIM) and SAP's Cloud Platform Integration for Data Services (SAP CPI DS). Therefore, such an SAP oriented architecture can be viewed as proprietary and inflexible.

The foregoing SAP components can only provision business data associated with system of record elements 103, 106, and 109 for a limited number of cloud storage environments, workforce accessible applications, business processes and machine learning and data science services. This limitation is represented by the subscript "a" of cloud storage environment 121, workforce accessible applications 124, business processes 127 and machine learning and data science services 130. Moreover, providing the business data to the respective storage, application and service functions requires, in virtually every case, custom programming and configuration by way of the limited SAP tools available that are referenced above.

Similarly, architecture 105b may be a Microsoft Azure cloud computing service oriented architecture running with an SAP backend 133 and SAP system of record elements 136, 139 and 141. Such an Azure oriented architecture may be limited at the connect layer 144 to an Azure Integrated Runtime capability. And, such an Azure oriented architecture might be limited at integration layer 147 to Azure Data Factory. Therefore, such an Azure oriented architecture can be viewed as proprietary and inflexible.

The foregoing Azure components can only provision business data associated with system of record elements 136, 139, and 141 for a limited number of cloud storage environments, workforce accessible applications, business processes and machine learning and data science services. This limitation is represented by the subscript "b" of cloud storage environment 150, workforce accessible applications 153, business processes 156 and machine learning and data science services 159. Moreover, providing the business data to the respective storage, application and service functions requires, in virtually every case, custom programming and configuration by way of the limited Azure tools and limited SAP backend tools available that are referenced above.

And similarly, architecture 105c may be an Amazon Web Services (AWS) cloud computing service oriented architecture running with an SAP backend 162 and SAP system of record elements 165, 168 and 171. Such an AWS oriented architecture may be limited at the connect layer 174 to an Amazon Direct Connect capability. And, such an AWS oriented architecture might be limited at integration layer 177 to Amazon Ingress/Egress. Therefore, such an AWS oriented architecture can be viewed as proprietary and inflexible.

The foregoing AWS components can only provision business data associated with system of record elements 165, 168, and 171 for a limited number of cloud storage environments, workforce accessible applications, business processes and machine learning and data science services. This limitation is represented by the subscript "c" of cloud storage environment 180, workforce accessible applications 183, business processes 186 and machine learning and data science services 189. Moreover, providing the business data to the respective storage, application and service functions requires, in virtually every case, custom programming and configuration by way of the limited AWS tools and limited SAP backend tools available that are referenced above.

Consequently, what is needed is and improvement and supplementation of the traditional architectures that make all data associated with system of record elements available on demand, live and in real time, and in batch mode, to any cloud storage environment, any workforce accessible application, any business process application, any machine learning and data science service, application and function, as well as any on-premise application that operates behind a connect layer. Additionally, what is needed is a system and method that provides such functionality without requiring custom software code and custom configuration in order to provision and provide business data to a given cloud storage environment, workforce accessible application, business process application, machine learning and data science service, application and function, and/or on-premise application that operates behind a connect layer.

Moreover, what is desired is system and method can be used on a fee per use model, and can provide live real time data as well as batch mode data.

SUMMARY

In exemplary embodiments of the present invention, a system and method for on-demand SAP data access using OData API on REST protocol in real time and batch mode for cloud and on-premise applications are provided. In exemplary embodiments the system and methods provide no-code functionality. No-code functionality means that no custom software is required beyond the inventive system and method in order to facilitate provisioning of the SAP data for consumption by cloud and on-premise applications, and for cloud storage.

An exemplary embodiment of the present invention comprises an on-demand data ingestion system comprising a service module operable on a fee per use basis. The service module is configured to execute a first provisioning request for first provisioned data for use by a first application in real time and configured to execute a second provisioning request for second provisioned data for storage to a first cloud storage.

The exemplary system also comprises an integration layer configured to receive the first and the second provisioning request from the service module and configured to transmit a first and a second data extraction request according to an industry standard non-proprietary communications protocol.

The exemplary system further comprises a service agent configured to receive the first and the second data extraction requests from the integration layer and configured to extract first and second extracted data from business data. The service agent is further configured to provision the first extracted data suitably for use by the first application in real time and to provision the second extracted data suitably for storage to the first cloud storage and configured to transmit the first and second extracted data according to the industry standard non-proprietary communications protocol.

Another exemplary embodiment of the present invention comprises an on-demand data ingestion system comprising a service module configure to execute a first provisioning request. The exemplary embodiment further comprises an integration layer configured to receive the first provisioning request from the service module and a service agent configured to receive a first data extraction request from the integration layer. The service agent is configured to extract first extracted data from business data. The service agent is further configured to provision the first extracted data suitably for use by a first cloud-based application and configured to transmit the first extracted data for receiving by the first cloud-based application.

Another exemplary embodiment of the present invention comprises a method for on-demand data ingestion comprising the steps of executing by a service module a first provisioning request, receiving by an integration layer the first provisioning request from the service module, receiving by a service agent a first data extraction request from the integration layer, extracting by the service agent first extracted data from business data; provisioning by the service agent the first extracted data suitably for use by a first application; and transmitting the first extracted data for receiving by the first application.

BRIEF DESCRIPTION OF DRAWINGS

These and other features, aspects, and advantages of the present invention will become better understood with regard to the following descriptions, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

So that the manner in which the features and advantages of embodiments of methods and systems of the present invention may be understood in more detail, a more particular description of the present invention briefly summarized above may be had by reference to certain embodiments thereof that are illustrated in the appended drawings, which form a part of this specification. The drawings illustrate only certain embodiments of the present invention and are, therefore, not to be considered limiting of the scope of the present invention which includes other useful and effective embodiments as well.

Figure 2:
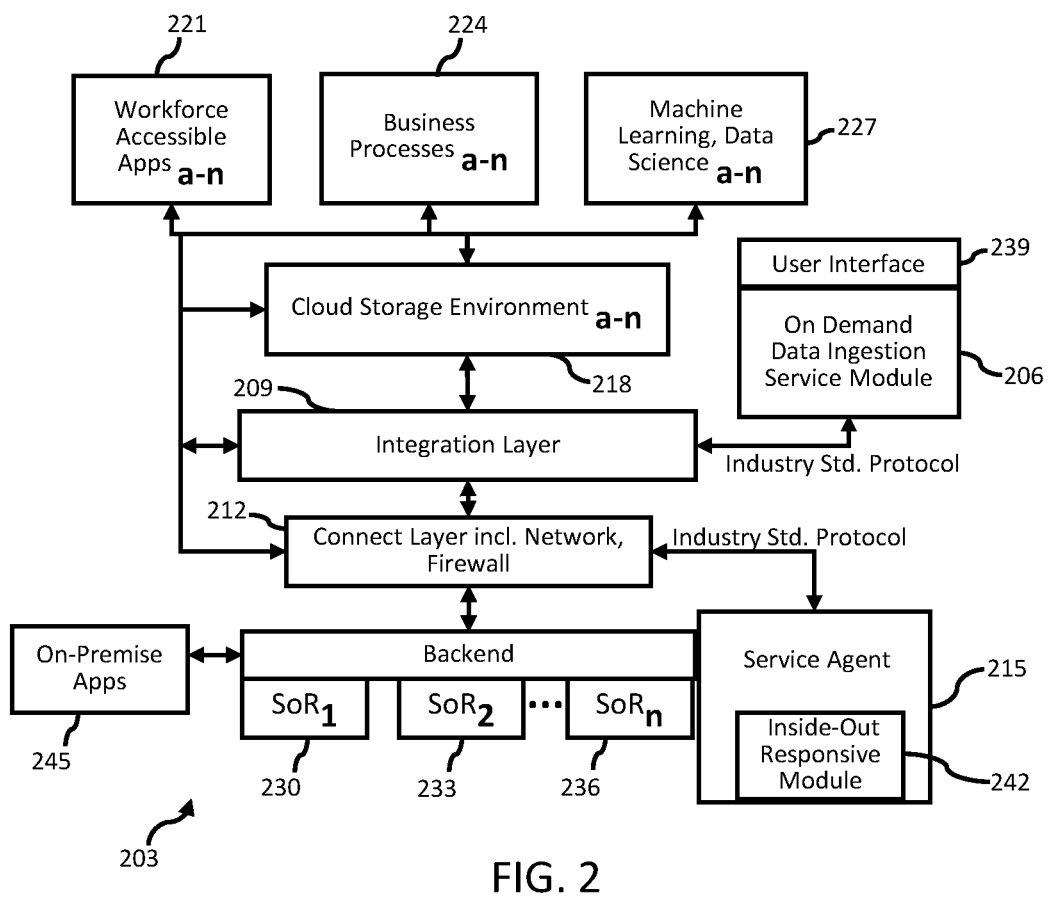
FIG. 2 is a block diagram of an exemplary embodiment of a system consistent with the present invention.

FIG. 2 is a block diagram of an exemplary embodiment of a system consistent with the present invention. FIG. 2 illustrates a business data handling and processing architecture 203 consistent with the present invention. As will be explained in more detail below, architecture 203 comprises an on-demand data ingestion (ODDI) service module 206 which in this embodiment is web-based residing in the cloud. Service module 206 is in communication with integration layer 209. Architecture 203 additionally comprises service agent 215 which is in communication with connect later 212 and backend layer 218.

According to this exemplary embodiment, ODDI service module 206 is configured to initiate data requests which are provided to service agent 215 conforming to an industry standard non-proprietary communications protocol. In certain embodiments, that protocol conforms to Open Data Protocol (OData) protocol and Representational State Transfer (REST) protocol. The data requests are for data to be provisioned for and delivered to one or more of cloud storage environment 218, workforce accessible application 221, business process application 224 and/or machine learning and data science service 227.

More specifically, in this exemplary embodiment, a provisioning request is transmitted to integration layer 209. The provisioning request indicates what data is required from one or more system of record elements 230, 233 and 236.

In the exemplary embodiment, the enterprise business associated with architecture 203 runs on SAP. Accordingly, the data in system of record elements 230, 233 and 236 comprise SAP defined data formats, SAP table formats, and SAP data structures. In the exemplary embodiment, it is this SAP data that is extracted and provisioned in real time and/or batch mode for cloud and/or on-premise application use, as well as cloud storage. Moreover, the exemplary system is configured to provide no-code functionality. More specifically, no custom software is required in order to facilitate provisioning of the SAP data for consumption by cloud and on-premise applications, and for cloud storage.

The provisioning request also indicates which of cloud storage 218 and workforce accessible application 221 and business process application 224 and machine learning and data science service 239 are to be sent the data. Integration layer 209 receives the provisioning request and transmits a corresponding data extraction request to connect layer 212. Connect layer 212 transmits the data extraction request to service agent 215.

Service agent 215 interacts with backend 218 to extract data from one or more of system of record elements 230, 233 and/or 236, corresponding to the data requested. Service agent 215 provisions the data appropriately for the target cloud storage environment 218, workforce accessible application 221, business process application 224 and/or machine learning and data science service 227.

The service agent then transmits the provisioned data through connect layer 212 to the desired destination. In this exemplary embodiment the data is transmitted conforming to an industry standard non-proprietary communications protocol. In certain embodiments, that protocol conforms to Open Data Protocol (OData) protocol and Representational State Transfer (REST) protocol. The connect layer may transmit the extracted and provisioned data through integration layer 209, or alternatively directly to the intended destination.

In this embodiment the data files may be provided in comma-separated value format (CSV) or JavaScript Object Notation format (JSON). As part of the provisioning, the files include metadata that are indicative of the file content, format and context which facilitates use by the target storage environment and/or application and or service.

In this exemplary embodiment, by virtue of the system comprising ODDI service module 206, and service agent 215 integrated with backend 218, and by virtue of the communication conforming to an industry standard non-proprietary communications protocol, in particular Open Data Protocol (OData) protocol and Representational State Transfer (REST) protocol, significant advantages are provided over prior art architectures. In particular, custom software and configuration are not required for provisioning data for various cloud storage environments, workforce accessible applications, business process and machine learning and data science services. Rather, ODDI service module 206 provides for the selection of one or more of such destinations, and selection of the data desired, and service agent 215 extracts the data, provisions the data suitably for such destination, and transmits the data according to an industry standard format for storage or consumption.

Additionally, by virtue of the system comprising ODDI service module 206 service agent 215 existing independently from the remaining entrenched architectural elements, the flexible data provisioning capability of the system may be operable on a fee per use basis. More specifically, in an exemplary embodiment, a third party service provider may provides service module 206 and service agent 215 to a client, and provide access to and use of the system on a fee for use basis.

Consequently, a system according to the exemplary embodiment of the present invention can flexibly serve an indefinite number of cloud storage environments, such a any/all of Microsoft's Azure, Amazon's AWS, and Google's Cloud Platform. Similarly, the system can provision data to an indefinite and varied number of workforce accessible applications, business processes, and machine learning and date science services. This flexibility is represented in FIG. 2 by the a-n subscript associated with cloud storage environment 218, workforce accessible apps 221, business processes 224 and machine learning and data science services 227.

Figure 1:
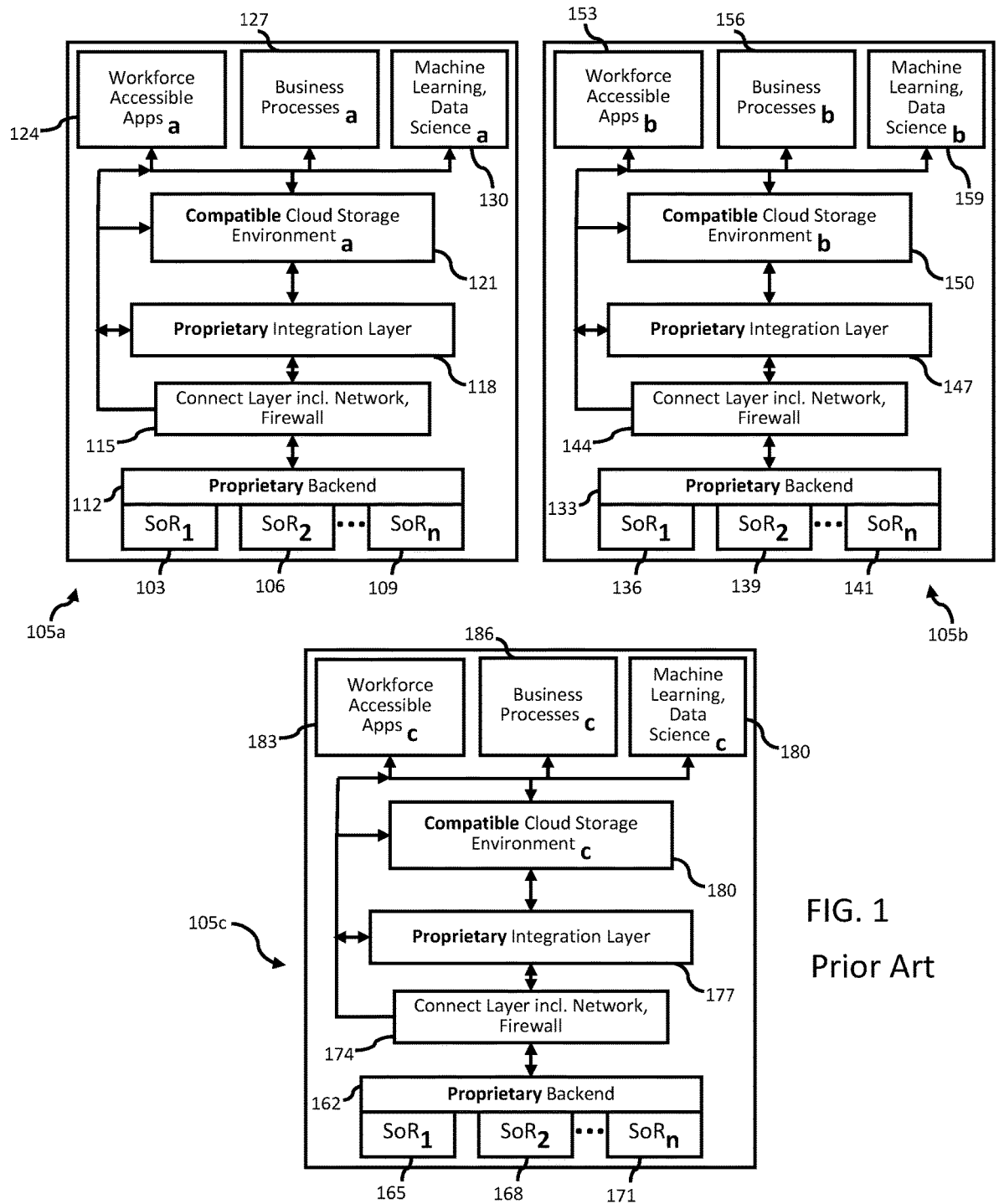
FIG. 1 is several block diagrams of prior art business data handling and processing architectures.

This flexibility is in contrasts to architectures 105a, 105b, and 105c of prior art FIG. 1, which are each limited to specific cloud storage, applications and services depending upon what software elements such as backend and integration layer elements are entrenched in the respective systems. Moreover, custom software and configuration are required by those prior art systems to provision business data for any new use not currently provided for by the established architecture.

Returning to FIG. 2, FIG. 2 illustrates further advantageous system elements. More specifically, FIG. 2 illustrates user interface 239 integrated with ODDI service module 206. User interface 239 facilitates a user constructing a data provisioning request including a storage 218 and/or application 221, 224 and/or service 227 destination, and including what specific data is to be extracted, provisioned and transmitted.

A data provisioning request can be requested through user interface 239 in real time, requesting live data for use, for example, by a visualization workforce accessible application 221 such as live mapping or a live dashboard. Alternatively, a data provisioning request can be formatted through user interface 239, and then set to be transmitted (triggered) according to a predetermined schedule. Alternatively, a data provisioning request can be formatted through user interface 239 and then set to be transmitted (triggered) in response to a predetermined event.

FIG. 2 further illustrates inside-out responsive module 242 integrated with service agent 215. In certain embodiments, a provisioning request will originate from an "on-premise" software element which resides behind connect layer 212, on the same side as service agent 215, and not from service module 206. In such an instance, inside out responsive module 242 will receive a corresponding data extraction request, and extract, provision and transmit the provisioned data accordingly.

FIG. 2 additionally illustrates on-premises applications 245 which may be present in certain embodiments. On-premise applications 245 may be similar in nature to workforce accessible applications 221 and/or business process applications 224. However, on premise applications 245 reside behind connect layer 212, on the same side as service agent 215. According to certain embodiments, data extracted and provisioned by service agent 215 may be transmitted to on-premise applications 245 as opposed to a destination outside of connect layer 212.

Figure 3:
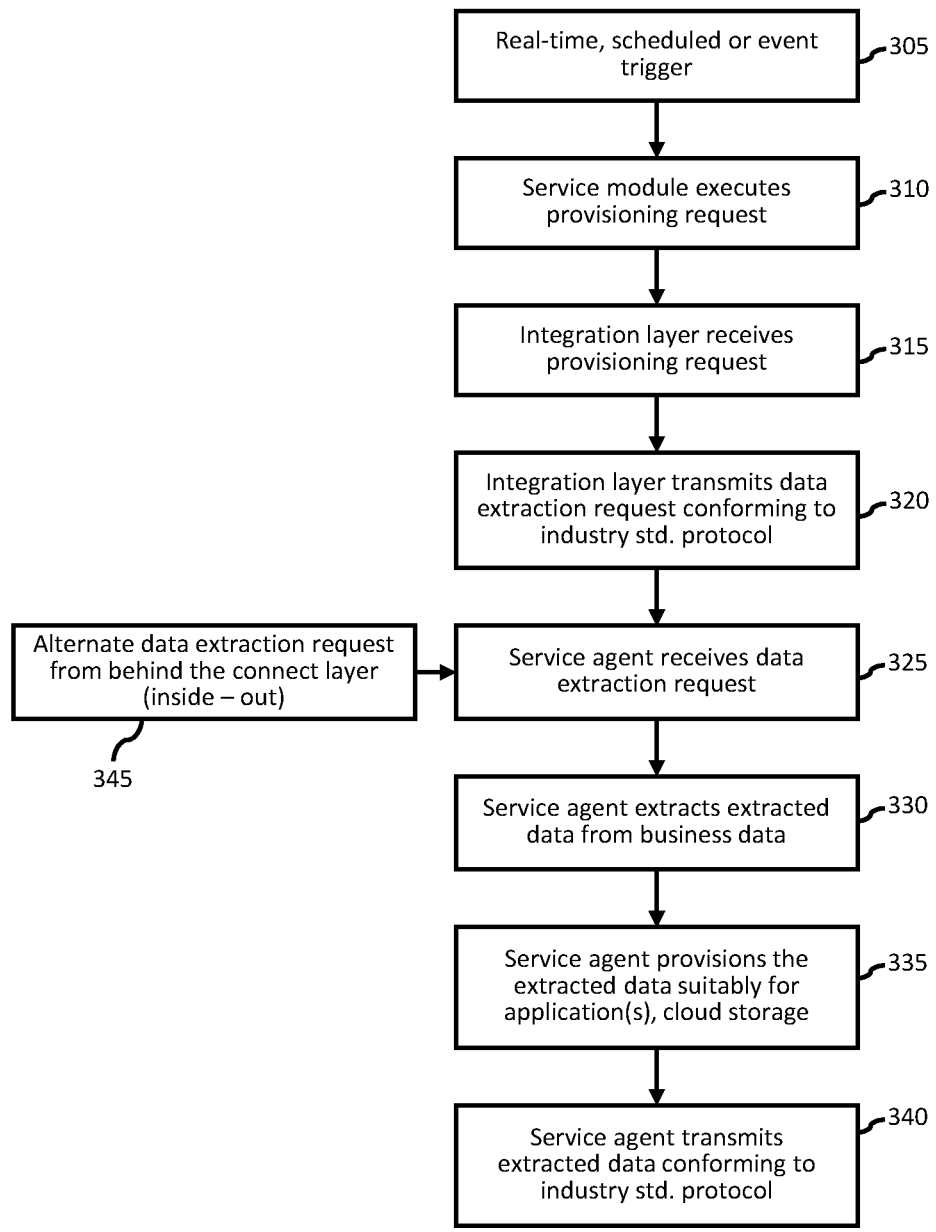
FIG. 3 is a flowchart of an exemplary method consistent with the present invention.

Turning to FIG. 3, FIG. 3 is a flowchart of an exemplary method consistent with the present invention. In the illustrated exemplary embodiment, a real-time or scheduled or event trigger occurs at step 305. At step 310, in response to the trigger, a service module (for example service module 206) executes a provisioning request. At step 315 an integration layer (for example integration layer 209) receives the provisioning request. At step 320 the integration layer transmits a data extraction request in a format conforming to an industry standard non-proprietary communications protocol. In certain embodiments, that protocol conforms to Open Data Protocol (OData) protocol and Representational State Transfer (REST) protocol.

At step 325 a service agent (for example service agent 215) receives the data extraction request. At step 330 the service agent extracts the requested data from business data (for example the data associated with system of record elements 230, 233 and 236).

At step 335 the service agent provisions the extracted data suitably for cloud storage (for example cloud storage 218), or an application (for example application 221 or 224) or a machine learning or data science service (for example service 227). At step 340, the service agent transmits the provisioned data in a format conforming to an industry standard non-proprietary communications protocol. In certain embodiments, that protocol conforms to Open Data Protocol (OData) protocol and Representational State Transfer (REST) protocol.

In certain embodiments, at step 345, a data extraction request may be transmitted to the service agent not from the integration layer, but instead from on-premise, inside of the connect layer.

Consequently what is provided by exemplary systems and methods according to the present invention is improvement and supplementation of the traditional architectures that make all data associated with system or record elements available on demand, live and in real time, and in batch mode, to any cloud storage environment, any workforce accessible application, any business process application, any machine learning and data science service, application and function, as well as any on-premise application that operates behind a connect layer.

Additionally, what is provided is a system and method that provides such functionality without requiring custom software code and custom configuration in order to provision and provide business data to a given cloud storage environment, workforce accessible application, business process application, machine learning and data science service, application and function, and/or on-premise application that operates behind a connect layer.

Also, the system and method can be conveniently implemented on a fee for use model.

Some portions of this description describe the embodiments of the invention in terms of algorithms. These operations, while described functionally, computationally, or logically, are understood to be implemented by computer programs or equivalent electrical circuits, micro-code, or the like. The described operations may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to herein may include a single processor or may be implemented with architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially available operating systems and other known applications for purposes such as database management. These devices can also include other electronic devices, such as dummy terminals, virtual terminals, thin-clients, and other devices capable of communicating via a network.

Embodiments can utilize at least one network that would be familiar to those skilled in the art for supporting communications using any of a variety of commercially available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, or any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python, or TCL, as well as combinations thereof. The server(s) may also include database servers, including without limitation those commercially available from Oracle®, Microsoft®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element, or keypad) and at least one output device (e.g., a display screen, a display device, printer, or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed, and/or removable storage devices as well as storage media for temporarily and/or more permanently containing, storing, transmitting, and retrieving computer-readable information. The system and various devices also can include a number of software applications, modules, services, or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets, APIs, scripts, and the like), or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments and that many modifications and variations are possible.

The foregoing description of the embodiments of the invention has been presented for the purpose of illustration; it is not intended to be exhaustive or to limit the invention to the precise forms disclosed. The description and drawings are, accordingly, to be regarded in an illustrative rather than a restrictive sense. The language used in the specification has been principally selected for readability and instructional purposes. It is therefore intended that the scope of the invention be limited not by this detailed description and drawings, but rather by any claims that issue based on this application. It will, however, be evident that various modifications and changes may be made thereunto without departing from the broader spirit and scope of the invention as set forth in the claims.

What is claimed is:

1. An on-demand data ingestion system comprising:
a service module, the service module operable on a fee per use basis, the service module configured to execute a first provisioning request for first SAP system of record enterprise data for use by a first application in real time, and configured to execute a second provisioning request for second SAP system of record enterprise data for storage to a first cloud storage;
wherein the service module is configured to execute the first provisioning request in response to a trigger selected from the group consisting of a real-time user request trigger, a scheduled trigger, and an event-based trigger,
an integration layer configured to receive the first and the second provisioning requests from the service module and configured to transmit a first and a second data extraction request according to Open Data Protocol (OData) protocol and Representational State Transfer (REST) protocol;
a service agent configured to receive the first and the second data extraction requests from the integration layer and configured to extract first and second extracted data from the first and the second SAP system of record enterprise data; and the service agent further configured to provision the first extracted data suitably for use by the first application in real time and to provision the second extracted data suitably for storage to the first cloud storage and configured to transmit the first and second extracted data according Open Data Protocol (OData) protocol and Representational State Transfer (REST) protocol.

2. The system if claim 1, wherein the service agent is capable of provisioning third SAP system of record enterprise data for every workforce accessible application in communication with the system, and for every business process application in communication with the system, and for the first cloud storage, thereby providing no-code functionality.

3. The system of claim 1, wherein the service agent further comprises an inside-out module responsive to a third data extraction request not received from the integration layer.

4. The system of claim 1, wherein the first application is configured to produce visualization output in real time, the visualization output representing the first extracted data.

5. The system of claim 1, wherein the business data comprises Enterprise Resource Planning (ERP) data.

6. An on-demand data ingestion system comprising:
   a service module configured to execute a first provisioning request,
      wherein the service module is configured to execute the first provisioning request in response to a trigger selected from the group consisting of a real-time user request trigger, a scheduled trigger, and an event-based trigger;
   an integration layer configured to receive the first provisioning request from the service module;
   a service agent configured to receive a first data extraction request from the integration layer and configured to extract first extracted data from business data; and
   the service agent further configured to provision the first extracted data suitably for use by a first cloud-based application and configured to transmit the first extracted data for receiving by the first cloud-based application.

7. The system of claim 6, wherein the service module is operable on a fee per use basis.

8. The system of claim 6, wherein the integration layer is configured to transmit the first date extraction request according to an industry standard non-proprietary communications protocol and the service agent is configured to transmit the first extracted data according to the industry standard non-proprietary communications protocol.

9. The system of claim 8, wherein the industry standard non-proprietary communications protocol conforms to Open Data Protocol (OData) protocol and Representational State Transfer (REST) protocol.

10. The system of claim 6, wherein the first data extraction request is a request for live real-time data and the first cloud-based application is configured to produce visualization output in real time, the visualization output representing the first extracted data.

11. The system of claim 6, the service agent is configured to transmit the first extracted date to cloud storage and the first cloud-based application is a machine learning application.

12. The system of claim 6, wherein the service agent comprises an inside-out module responsive to a second data extraction request not received from the integration layer.

13. The system of claim 6, wherein the business data comprises data stored in an SAP table.

14. A method for on-demand data ingestion comprising the steps of:
   executing by a service module a first provisioning request, wherein
      the service module is configured to execute the first provisioning request in response to a trigger selected from the group consisting of a real-time user request trigger, a scheduled trigger, and an event-based trigger;
   receiving by an integration layer the first provisioning request from the service module;
   receiving by a service agent a first data extraction request from the integration layer;
   extracting by the service agent first extracted data from business data;
   provisioning by the service agent the first extracted data suitably for use by a first application; and
   transmitting the first extracted data for receiving by the first application.

15. The method of claim 14, wherein the service agent comprises an inside-out module responsive to a second data extraction request not received from the integration layer.

16. The method of claim 14, the step of receiving by the service agent the first data extraction request comprising receiving the first data extraction request according to an industry standard non-proprietary communications protocol, and the step of transmitting the first extracted data for receiving by the first application comprises transmitting the first extracted data according to the industry standard non-proprietary communications protocol.

17. The method of claim 16, wherein the industry standard non-proprietary communications protocol conforms to Open Data Protocol (OData) protocol and Representational State Transfer (REST) protocol.

18. The method of claim 14, wherein the service module is operable on a fee per use basis.

* * * * *